United States Patent

Kaplan

[11] Patent Number: 5,867,988
[45] Date of Patent: Feb. 9, 1999

[54] GEOTHERMAL POWER PLANT AND METHOD FOR USING THE SAME

[75] Inventor: Uri Kaplan, Moshav Galia, Israel

[73] Assignee: Ormat Industries Ltd., Yavne, Israel

[21] Appl. No.: 884,848

[22] Filed: Jun. 30, 1997

Related U.S. Application Data

[63] Continuation of Ser. No. 550,928, Oct. 31, 1995, abandoned, which is a continuation of Ser. No. 182,356, Jan. 18, 1994, abandoned.

[51] Int. Cl.$^6$ .................................................. F03G 7/00
[52] U.S. Cl. ............................ 60/641.2; 60/651; 60/652; 60/664
[58] Field of Search .................... 60/641.2, 651, 60/652, 664, 657, 655, 678, 679, 682

[56] References Cited

U.S. PATENT DOCUMENTS

| | | | |
|---|---|---|---|
| 4,043,129 | 8/1977 | McCabe et al. | 60/641.2 |
| 4,054,175 | 10/1977 | Swearinger | 60/641.2 |
| 4,102,133 | 7/1978 | Anderson | 60/641.2 |
| 4,358,930 | 11/1982 | Pope et al. | 60/641.2 |
| 4,967,559 | 11/1990 | Johnston | 60/641.2 |
| 4,976,100 | 12/1990 | Lee | 60/657 |
| 4,982,568 | 1/1991 | Kalina | 60/641.2 |
| 5,190,664 | 3/1993 | Gallup et al. | 60/641.2 |

OTHER PUBLICATIONS

Javellana, S.P., "Strategies for Sustainable Long Term Geothermal Development in the Philippines", Proceedings 15th Geothermal Workshop 1993, pp. 17–19.

Barnett, P.R. et al., "Approached to Controlling Silica Deposition in Geothermal Production Operations", Proceedings 15th Geothermal Workshop 1993, pp. 107–111.

*Primary Examiner*—Hoang Nguyen
*Attorney, Agent, or Firm*—Donald M. Sandler

[57] ABSTRACT

Extracted geothermal fluid (which may comprise geothermal liquid or brine) is used to operate a power plant by applying the extracted geothermal fluid to a vaporizer containing pre-heated working fluid for producing vaporized working fluid and from which heat depleted geothermal fluid is extracted. A portion of the heat depleted geothermal fluid is applied to a pre-heater containing liquid working fluid for producing the pre-heated working fluid, and for producing further heat depleted geothermal fluid. The vaporized working fluid is expanded in a turbogenerator for generating power and producing expanded vaporized working fluid; and, the expanded vaporized working fluid produced by the turbogenerator is condensed into liquid working fluid that is pre-heated. The portion of said heat depleted geothermal fluid that is not applied to said pre-heater and the further heat depleted geothermal fluid are separately re-injected into the ground.

25 Claims, 1 Drawing Sheet

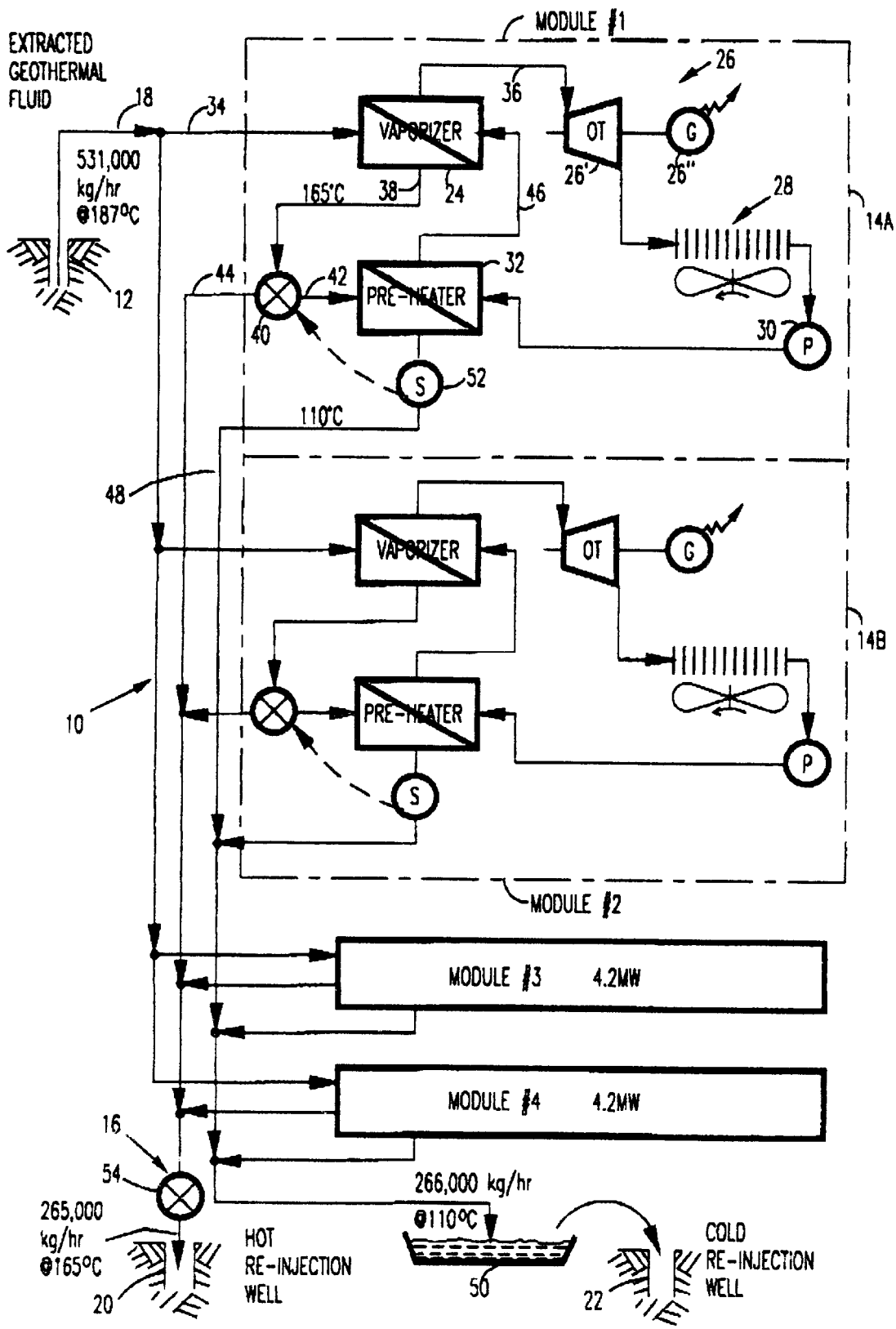

GEOTHERMAL POWER PLANT AND METHOD FOR USING THE SAME

This application is a continuation of application Ser. No. 08/550,928, filed Oct. 31, 1995, now abandoned, which is a continuation of application Ser. No. 08/182,356, filed Jan. 18, 1994, now abandoned.

TECHNICAL FIELD

This invention relates to a geothermal power plant and a method for using the same.

BACKGROUND ART

Power plants operating on geothermal fluid have been constructed in many countries throughout the world. The physical properties of extracted geothermal fluid, such as its temperature, pressure, flow rate and chemical capacity, are important factors that determine the design of the power plant. Power plants operating in geothermal fields where the temperature of the extracted geothermal fluid is under 200° C. typically utilize an organic working fluid such as one of the Freons, n-pentane, isopentane, etc. In such plants, the extracted geothermal fluid is applied to a vaporizer containing organic fluid which is vaporized and supplied to a turbogenerator wherein expansion takes places generating electricity. The exhaust from the turbogenerator is applied to a condenser, typically air cooled, to produce a condensate that is returned to the vaporizer by a cycle pump to complete the organic fluid cycle. Typically, heat depleted geothermal fluid produced by the vaporization of the organic fluid is disposed of in a re-injection well that returns the heat depleted geothermal fluid to the ground.

In order to increase the thermodynamic efficiency of such a power plant, the heat depleted geothermal fluid produced by the vaporizer is first passed through a pre-heater producing further heat depleted geothermal fluid which is then disposed of by re-injection. While this approach is advantageous in that additional heat is extracted from the geothermal fluid thus increasing the generating capacity of the power plant, serious problems will arise when the mineral content of the extracted geothermal fluid exceeds certain limits. That is to say, some geothermal fluids have such a high concentration of minerals, such as silica, that incipient precipitation occurs within the pre-heater and/or in the piping that connects the pre-heater to the re-injection well, and/or, even in the well bore of the re-injection well itself. For obvious reasons, this is not acceptable. As a result, the use of pre-heaters is often precluded to the detriment of generating capacity.

It is therefore an object of the present invention to provide a new and improved geothermal power plant and method for using the same which provides a measure of control over incipient precipitation in the components of a power plant.

BRIEF DESCRIPTION OF THE INVENTION

According to the present invention, extracted geothermal fluid, usually comprising geothermal liquid or brine, is used to operate a power plant by applying the extracted geothermal fluid to a vaporizer containing pre-heated working fluid for producing vaporized working fluid and from which heat depleted geothermal fluid is produced or withdrawn from the exit of the vaporizer. A portion of the heat depleted geothermal fluid is applied to a pre-heater containing liquid working fluid for producing the pre-heated working fluid, and from which further heat depleted geothermal fluid is produced or withdrawn from the exit if the pre-heater. The vaporized working fluid is expanded in a turbogenerator for generating power and producing expanded vaporized working fluid; and, the expanded vaporized working fluid produced by the turbogenerator is condensed into liquid working fluid that is then pre-heated. Both the portion of said heat depleted geothermal fluid that is not applied to said pre-heater and the further heat depleted geothermal fluid are re-injected into the ground.

The further heat depleted geothermal fluid produced or withdrawn from the exit of the pre-heater is supplied to a settling pond prior to re-injection into the ground via cold re-injection means. The portion of the heat depleted geothermal fluid not applied to the pre-heater is re-injected into hot re-injection means.

Since the amount of heat depleted geothermal fluid or brine applied to the pre-heater is reduced, the size of the settling pond is reduced. Moreover, by using a pre-heater for extracting heat from only a portion of the heat depleted geothermal fluid or brine exiting the vaporizer, the size of the settling pond is further reduced since the amount of heat to be dissipated in the settling pond is reduced. Furthermore, by thus reducing the temperature and flow rate of geothermal fluid or brine exiting the pre-heater and flowing to the settling pond, the emission of steam, vapors, and non-condensable gases, which are not environmentally acceptable, from the settling pond is reduced. In addition, by using a settling pond, silica and other precipitants in the settling pond, can be extracted and utilized for useful purposes.

In addition, by also controlling the amount of heat depleted geothermal fluid applied to the pre-heater, incipient precipitation in the pre-heater and its associated piping can be prevented in the face of variations in flow rate of the geothermal fluid, and its temperature and pressure. Consequently, maintenance associated with the power plant is simplified, costs are reduced, and greater on-line reliability is achieved.

The necessary control is effected by functionally relating size of the portion of the heat depleted geothermal fluid applied to said pre-heater to a physical parameter of the further heat depleted geothermal fluid. Preferably, the parameter is temperature.

BRIEF DESCRIPTION OF THE DRAWING

An embodiment of the present invention is described by way of an example below and with reference to the single FIGURE of the accompanying drawing.

DETAILED DESCRIPTION

Turning now to the drawing, reference numeral 10 designates a geothermal power plant according to the present invention comprising production well 12 from which geothermal fluid, usually comprising geothermal liquid or brine, is extracted, a plurality of power plant modules 14A, 14B, etc., to which the extracted geothermal fluid is applied, and re-injection means 16 for receiving spent geothermal fluid from the modules and returning the spent fluid to the ground. While four power plant modules are shown in the drawing, any number could be used depending on the mass flow available from the production well.

Each module 14A, 14B, etc. is identical, and receives extracted geothermal fluid in parallel via main conduit 18. Re-injection means 16 receives spent geothermal fluid from the modules in parallel, and includes hot re-injection well 20, and cold re-injection well 22.

Typically, each modules includes vaporizer 24, turbogenerator 26, condenser 28, cycle pump 30, and pre-heater 32, and associated piping. Vaporizer 24 contains pre-heated working fluid, preferably, n-pentane, isopentane, or other working fluid depending on the operating conditions. The vaporizer is responsive to extracted geothermal fluid applied via input conduit 34 connected to main conduit 18 for vaporizing the pre-heated working fluid and producing vaporized working fluid in conduit 36, and heat depleted geothermal fluid in conduit 38. In the example given, well 12 produces about 531,000 Kg/hr. of geothermal fluid at about 187° C., which means that about one-fourth of this mass flows into vaporizer 24. After vaporizing the organic fluid in the vaporizer, the spent, heat depleted organic fluid exits the vaporizer at about 165° C. It should be understood that the example shown in the drawings, an described herein, is only illustrative of the principles involved, and that the invention is application to other flow rates and other temperatures.

Valve 40 in conduit 38 serves as divider means for dividing the heat depleted geothermal fluid into two portions, one of which is applied to pre-heater 32 via inlet conduit 42, and the other of which is applied, via conduit 44, to hot re-injection well 20 of re-injection means 16. Pre-heater 32 contains liquid working fluid and is responsive to the portion of heat depleted geothermal fluid that is applied to the pre-heater by conduit 42 for pre-heating the liquid working fluid which is supplied to vaporizer 24 via conduit 46. As a result of the heat exchange operation that occurs within the pre-heater, additional heat is extracted from the heat depleted geothermal fluid forming further heat depleted geothermal fluid which exits the pre-heater through conduit 48. The further heat depleted geothermal fluid is applied, via conduit 48, to settling pond 50, and cold re-injection well 22 of re-injection means 16.

Turbogenerator 26 comprises organic vapor turbine 26' coupled to generator 26". Vaporized working fluid that flows from the vaporizer to the turbine via conduit 36, expands in the turbine and drives generator 26" which produces power. The expanded heat depleted working fluid exhausted from the turbine is applied to condenser 28 which condenses the expanded working fluid to a liquid. The condenser is shown as an air-cooled condenser, but a liquid cooled condenser, with an associated cooling tower, for example, could be used depending on design considerations. Finally, cycle pump 30 constitutes means for returning the liquid condensate to pre-heater 32 thus completing the working fluid cycle.

It should be noted that about half of the extracted geothermal fluid flows directly to the hot re-injection well after transferring heat to the vaporizers of the modules, and about half flows through the pre-heaters before entering settling pond 50. Since the amount of heat depleted geothermal fluid or brine applied to pre-heater 32 compared to the amount of geothermal fluid or brine applied to vaporizer 24 is reduced, the size of settling pond 50 is reduced. Moreover, by using pre-heater 32 for extracting heat from only a portion of the heat depleted geothermal fluid or brine exiting vaporizer 24, the size of settling pond 50 is further reduced. Reducing the temperature and flow rate of geothermal fluid or brine exiting pre-heater 32 and flowing to settling pond 50 in the described manner, reduces emission from the settling pond of environmentally unacceptable steam, vapors, and non-condensable gases. In addition, the provision of settling pond 50 permits the harvesting and use of silica and other precipitates in the pond.

The temperature of the further heat depleted geothermal fluid that exits the pre-heaters is selected in accordance with the amount and nature of the mineral content of the extracted geothermal fluid. Specifically, the temperature is selected to prevent incipient precipitation in the pre-heater and re-injection means 16. In the example shown, the exit temperature of the further heat depleted geothermal fluid is about 110° C., but this value is only an example, the actual value being a temperature consistent with the amount and nature of the minerals in the geothermal fluid.

In operation, the extracted geothermal fluid in the quantity indicated and at the temperatures indicated will be adequate to generate about 4.2 MW of electricity on a continuous basis. From actual experience, however, some variation in mass flow, temperature, and mineral content of the extracted geothermal fluid will occur over the life of the power plant. As a result, the design must have built into it a safety factor on the temperature of the further depleted geothermal fluid exiting the pre-heaters to inhibit maintenance problems. According to the present invention, preferably, the temperature of the further heat-depleted geothermal fluid is controlled by controlling the proportion of heat depleted geothermal fluid applied to the pre-heater. That is to say, valve 40 in conjunction with valve 54, is made adjustable so that the portion of heat depleted geothermal fluid entering conduit 42 for pre-heater 32 can be adjusted to maintain the temperature of the fluid exiting the pre-heater in conduit 48 at a level that will prevent precipitation. To this end, a physical parameter, or property, of the further heat depleted geothermal fluid in conduit 48 is sensed, and used to control the setting of valve 40 in conjunction with valve 54.

Preferably, sensor 52 at the outlet of the pre-heater senses the temperature of the further heat depleted geothermal fluid and generate a control signal that is applied to valves 40 and 54 for establishing the proportion of heat depleted geothermal fluid that is applied to the pre-heater. However, other parameters could be sensed for controlling the proportioning effected by valves 40 and 54.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for operating a power plant using extracted geothermal fluid comprising the steps of:
   a) applying said extracted geothermal fluid to a vaporizer containing pre-heated working fluid for producing vaporized working fluid and from which heat depleted geothermal fluid is extracted;
   b) dividing said heat depleted geothermal fluid into two portions, one of which is applied to a pre-heater containing liquid working fluid for producing said pre-heated working fluid, and from which further heat depleted geothermal fluid is extracted;
   c) expanding said vaporized working fluid produced in step a) in a turbogenerator for generating power and producing expanded vaporized working fluid;
   d) condensing said expanded vaporized working fluid produced in step c) into liquid working fluid that is pre-heated in step b); and
   e) re-injecting the portion of said heat depleted geothermal fluid that is not applied to said pre-heater, and said further heat depleted geothermal fluid into separate re-injection wells.

2. A method according to claim 1 including the step of supplying the further heat depleted geothermal fluid to a settling pond before re-injection.

3. A method according to claim 1, including the step of functionally relating size of the portion of said heat depleted geothermal fluid applied to said pre-heater to a physical parameter of said further heat depleted geothermal fluid.

4. A method according to claim 3 wherein said parameter is temperature.

5. A method according to claim 1 wherein the step of applying said extracted geothermal fluid to a vaporizer is carried out by applying brine to the vaporizer.

6. A method for operating a power plant using extracted geothermal fluid comprising the steps of:
   a) applying said extracted geothermal fluid to a vaporizer containing pre-heated working fluid for producing vaporized working fluid and from which heat depleted geothermal fluid is extracted;
   b) dividing said heat depleted geothermal fluid into two portions, one of which is applied to a pre-heater containing liquid working fluid for producing said pre-heated working fluid, and from which further heat depleted geothermal fluid is extracted;
   c) expanding said vaporized working fluid produced in step a) in a turbogenerator for generating power and producing expanded vaporized working fluid;
   d) condensing said expanded vaporized working fluid produced in step c) into liquid working fluid that is pre-heated in step b);
   e) re-injecting the portion of said heat depleted geothermal fluid that is not applied to said pre-heater and said further heat depleted geothermal fluid; and
   f) selectively controlling the ratio of said two portions.

7. A method according to claim 6 including controlling said ratio in accordance with the temperature of the further heat depleted geothermal fluid after extraction from said pre-heater.

8. A module for a geothermal power plant that operates on extracted geothermal fluid, said module comprising:
   a) a vaporizer containing pre-heated working fluid and responsive to said extracted geothermal fluid for producing vaporized working fluid and from which heat depleted geothermal fluid is extracted;
   b) divider means for dividing said heat depleted geothermal fluid into two portions;
   c) a pre-heater containing liquid working fluid and responsive to one of said portions of said heat depleted geothermal fluid for pre-heating said liquid working fluid and from which further heat depleted working fluid is extracted
   d) means for supplying working fluid pre-heated in said pre-heater to said vaporizer;
   e) a turbogenerator responsive to said vaporized working fluid for producing power and expanded vaporized working fluid;
   f) a condenser for condensing said expanded vaporized working fluid to condensate;
   g) means for returning said condensate to said pre-heater;
   h) re-injection means for re-injecting the other of said two portions and said further heat depleted working fluid; and
   i) means for selectively controlling the ratio of said two portions.

9. A module according to claim 8 including:
   a) a temperature sensor for sensing the temperature of said further heat depleted geothermal fluid after extraction from said pre-heater; and
   b) said means for selectively controlling includes a valve for controlling said ratio in accordance with the temperature sensed by said temperature sensor.

10. A module according to claim 9 wherein said re-injection means includes hot re-injection means for re-injecting said other of said two portions into a hot re-injection well, and cold re-injection means for re-injecting said further heat depleted working fluid into a cold re-injection well.

11. A module according to claim 10 including a settling pond upstream of said cold re-injection well for receiving said further heat depleted geothermal fluid.

12. A module for a geothermal power plant that operates on extracted geothermal fluid, said module comprising:
   a) a vaporizer containing pre-heated working fluid and responsive to said extracted geothermal fluid for producing vaporized working fluid and from which heat depleted geothermal fluid is extracted;
   b) divider means for dividing said heat depleted geothermal fluid into two portions;
   c) a pre-heater containing liquid working fluid and responsive to one of said portions of said heat depleted geothermal fluid for pre-heating said liquid working fluid and from which further heat depleted working fluid is extracted;
   d) means for supplying working fluid pre-heated in said pre-heater to said vaporizer;
   e) a turbogenerator responsive to said vaporized working fluid for producing power and expanded vaporized working fluid;
   f) a condenser for condensing said expanded vaporized working fluid to condensate;
   g) means for returning said condensate to said pre-heater; and
   h) re-injection means for re-injecting the other of said two portions and said further heat depleted working fluid into separate re-injection wells.

13. A module according to claim 12, wherein said re-injection means includes hot re-injection means for re-injecting said other of said two portions into a hot re-injection well, and cold re-injection means for re-injecting said further heat depleted working fluid into a cold re-injection well.

14. A module according to claim 13, including a settling pond upstream of said cold re-injection well for receiving said further heat depleted geothermal fluid.

15. A module according to claim 13, including control means for operating said divider means for establishing the relative sizes of said two portions.

16. A module according to claim 15, wherein said control means is responsive to a physical property of said further heat depleted geothermal fluid.

17. A module according to claim 15 wherein said physical property of sad further heat depleted geothermal fluid is its temperature.

18. A geothermal power plant comprising a plurality of modules according to claim 16, including means for supplying said extracted geothermal fluid to each vaporizer of said modules in parallel.

19. A geothermal power plant according to claim 18, including means for serially collecting the portions of the heat depleted geothermal fluid that is not applied to the pre-heaters of said modules and applying such portions to said hot rejection means.

20. A geothermal power plant according to claim 18, including means for serially collecting the further heat depleted geothermal fluid for each of said modules and applying the result to said cold re-injection means.

21. A geothermal power plant according to claim 18, including means for serially collecting the portions of the heat depleted geothermal fluid that is not applied to the pre-heaters of said modules and applying such portions to said hot rejection means, and means for serially collecting the further heat depleted geothermal fluid for each of said modules and applying the result to said cold re-injection means.

22. A module according to claim 12 wherein the extracted geothermal fluid is brine.

23. A module according to claim 12 wherein said working fluid is organic.

24. A module according to claim 12 wherein said working fluid is n-pentane.

25. A module according to claim 12 wherein said working fluid is isopentane.

* * * * *